United States Patent [19]

Thirion de Briel

[11] Patent Number: 5,337,873
[45] Date of Patent: Aug. 16, 1994

[54] FRICTION LINER FOR A CLUTCH FRICTION PLATE HAVING A PLURALITY OF FRICTION LINERS, ESPECIALLY FOR A MOTOR VEHICLE

[75] Inventor: Jacques Thirion de Briel, Levallois-Perret, France

[73] Assignee: Valeo, Paris, France

[21] Appl. No.: 856,566

[22] Filed: Mar. 24, 1992

[30] Foreign Application Priority Data

Mar. 26, 1991 [FR] France ................. 91 03643

[51] Int. Cl.$^5$ .................... F16D 65/00; F16D 13/64
[52] U.S. Cl. .................... 192/107 R; 192/70.14; 188/218 XL
[58] Field of Search ............ 192/107 R, 70.14, 107 C; 188/73.2, 218 XL

[56] References Cited

U.S. PATENT DOCUMENTS

| 4,202,432 | 5/1980 | Komori | 192/107XR |
| 4,270,640 | 6/1981 | Davies | 192/70.14 |
| 4,565,274 | 1/1986 | Cameron | 192/107 R |

FOREIGN PATENT DOCUMENTS

| 2247207 | 4/1973 | Fed. Rep. of Germany . | |
| 2822729 | 12/1978 | Fed. Rep. of Germany ... | 192/107 C |
| 2140101 | 1/1973 | France . | |
| 241741 | 10/1925 | United Kingdom ............ | 192/107 R |

*Primary Examiner*—Richard M. Lorence
*Attorney, Agent, or Firm*—Longacre & White

[57] ABSTRACT

A friction liner for a motor vehicle clutch friction plate comprises a metallic support plate overlaid with a pad of friction material. The surface of the metallic support plate on which the pad of friction material is overlaid is smaller than the working surface of the pad, thus reducing the detrimental effects of deformation of the friction liner resulting from its heating.

3 Claims, 2 Drawing Sheets

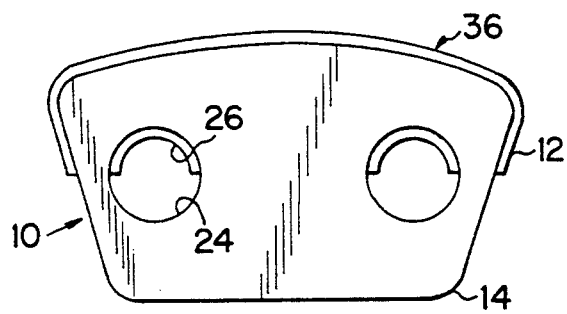
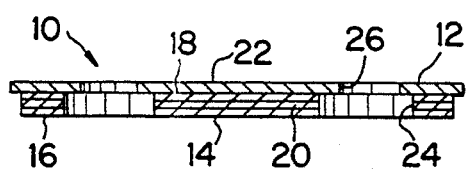
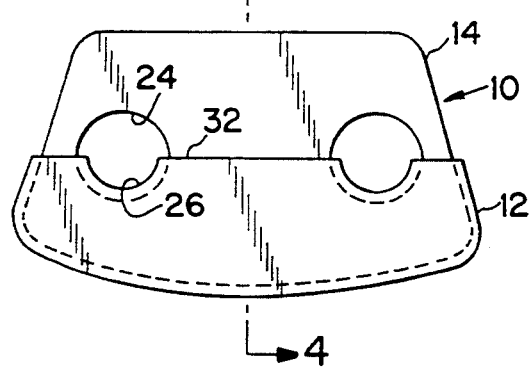
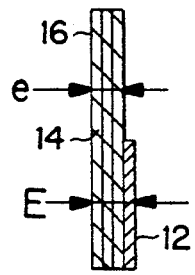
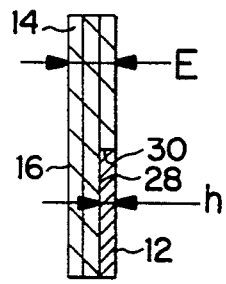
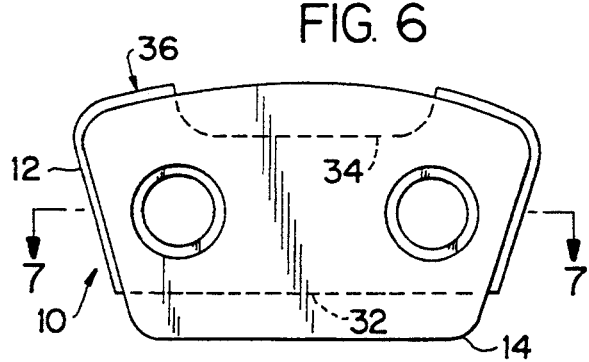
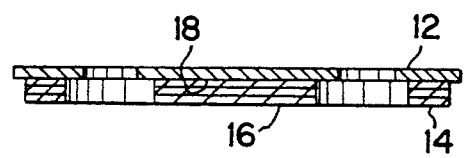
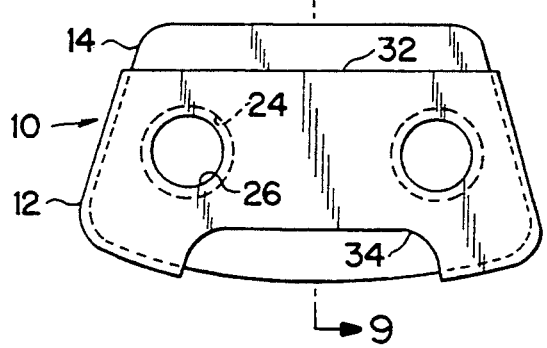
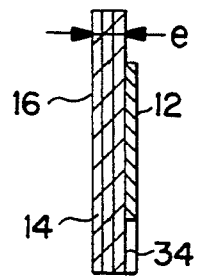
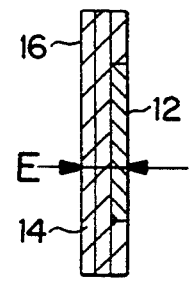

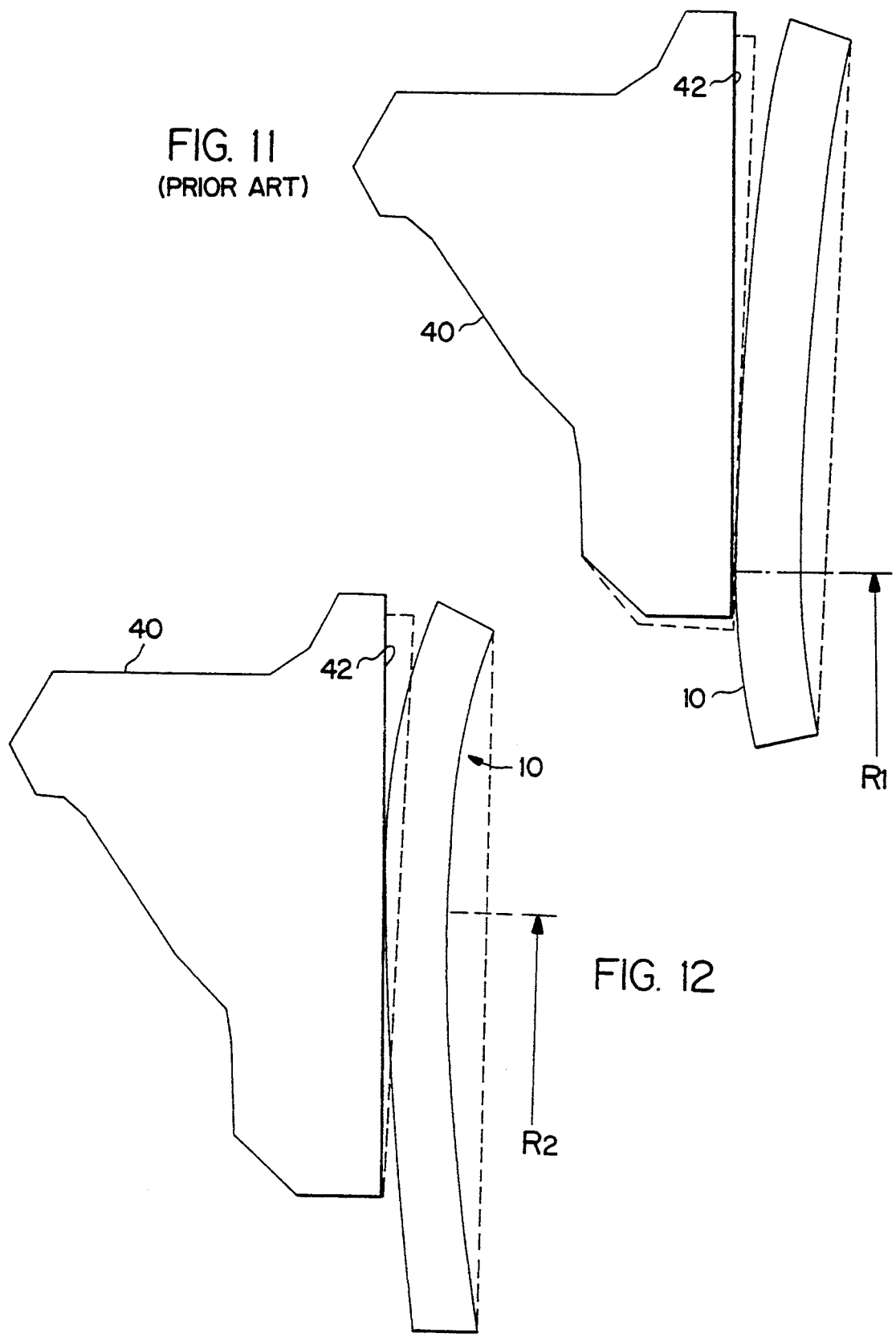

5,337,873

FRICTION LINER FOR A CLUTCH FRICTION PLATE HAVING A PLURALITY OF FRICTION LINERS, ESPECIALLY FOR A MOTOR VEHICLE

FIELD OF THE INVENTION

The present invention relates to a friction liner for a clutch friction plate. More particularly, the invention is concerned with a friction liner of the kind comprising a metallic support plate overlaid with a pad of friction material having a working surface for contact with the pressure plate of the clutch.

BACKGROUND OF THE INVENTION

Such friction liners are used in the manufacture of clutch friction plates for motor vehicles, the clutch friction plate being of the kind including a face plate portion which carries at its outer periphery a plurality of friction liners which are distributed around the center of the clutch plate in such a way as to define an annular friction crown.

At each engagement of the clutch, the friction liners become progressively gripped between a pressure plate and a reaction plate of the clutch. Heating which is brought about by the corresponding friction displays differential or uneven thermal expansion, the result of which is that the pressure plate gradually adopts a conical shape. This is illustrated in FIG. 11 of the accompanying drawings, to which reference will be made in more detail later.

The metallic support plates and the friction liners also undergo deformation which gives the liners a curve such that, in the present state of the art, a large reduction develops over the course of time in the mean friction radius between the friction liners of the pressure plate. This leads to a major reduction in overall efficiency of the clutch, and therefore in torque transmission.

In addition, the zone in which the friction liners are subjected to pressure from the pressure plate becomes progressively offset towards the axis of the assembly. This leads to unequal wear of the friction liners and even perhaps the incidence of fracture.

DISCUSSION OF THE INVENTION

An object of the present invention is to overcome the above mentioned drawbacks.

According to the invention, a friction liner for a clutch friction plate, of the kind comprising a metallic support plate overlaid with a pad of friction material having a working surface, is characterised in that the surface of the metallic support plate overlaid with the friction material is smaller than the working surface of the pad of friction material.

According to a preferred feature of the invention, the thickness of the pad of friction material is constant.

In a modification, the surface of the pad of friction material which is in contact with the metallic support plate has at least one rebate, the depth of which is substantially equal to the thickness of the support plate, with the profile of the rebate substantially matching and surrounding the corresponding portion of the perimeter of the support plate, so that the friction liner has a substantially constant overall thickness.

In a first embodiment of the invention, the friction liner is substantially in the form of an annular sector, and in that the support plate extends facing the external portion of largest radius of the pad of friction material.

In a second embodiment of the invention, the metallic support plate is formed with a recess in its external peripheral edge.

Also included in the scope of the invention is a clutch friction plate which is characterised in that each of the friction liners is made in accordance with the present invention.

Further features and advantages of the invention will appear from the description of preferred embodiments of the invention given below, by way of example only and with reference to the accompanying drawings.

BRIEF DESCRIPTION OF THE DRAWINGS

FIG. 1 is a front view of a friction liner in a first embodiment of the invention.

FIG. 2 is a view in cross section taken on the line 2—2 in FIG. 1.

FIG. 3 is a rear view of the friction pad shown in FIG. 1.

FIG. 4 is a view in cross section taken on the line 4—4 in FIG. 3.

FIG. 5 is a view similar to FIG. 4, but showing a modified version of the same friction liner.

FIGS. 6 to 9 are views similar to those of FIGS. 1 to 4, but show a friction liner in accordance with the invention but in a second embodiment.

FIG. 10 is a view similar to FIG. 9, showing a modified version of that friction liner.

FIG. 11 is a diagrammatic view showing in cross section, taken on an axial plane, deformations due to heating of part of the pressure plate and a friction liner facing the latter, in the prior art.

FIG. 12 is a view similar to FIG. 11 in which the friction liner is made in accordance with the present invention.

DESCRIPTION OF PREFERRED EMBODIMENTS OF THE INVENTION

The friction liner 10 shown in FIGS. 1 to 4 is generally in the form of an annular sector. It comprises a metallic support plate 12, for example of steel, and a pad of friction material 14 which may for example be of a sintered type and which is brazed to the support plate 12. In a modification, it may be secured adhesively to the latter.

The pad of friction material 14 has a working face 16 for contact with the pressure plate of the clutch, and a fixing face 18 which is in contact with a facing surface 20 of the support plate 12. The support plate 12 has a peripheral shape which extends slightly outside the peripheral shape of the pad 14 in the zone in which the latter is superimposed on the support plate. The support plate 12 has a surface 22 opposite to the facing surface 20 carrying the friction pad 14, the surface 22 being a contact surface for making contact with a corresponding surface of a face plate portion (not shown) of a clutch friction plate. In this example, this contact is reduced. More precisely, and as shown in the drawings and more particularly in FIGS. 3 and 4, the surface area of the metallic support plate 12 is smaller than the working surface of the pad 14 of friction material. In order words, the general external contour of the friction liner 10 corresponds to the external contour of the pad 14 of friction material, this being curved.

In the first embodiment shown in FIGS. 1 to 4, the metallic support plate 12 extends to the upper portion of the friction liner, that is to say the upper portion of the latter as seen in FIG. 1, which is that portion of the friction liner 10 that has the largest radius. Its outer peripheral edge is in the form of an arc of a circle as indicated at 36. The friction liner 10 is formed with apertures towards its base or lower portion as seen in FIG. 1.

In this embodiment, the pad 14 of friction material has a thickness "e" which is constant, and therefore smaller than the overall thickness "E" of the friction liner 10 measured in the zone in which the metallic support plate 12 and pad 14 of friction material are superimposed on each other.

In a known manner, the metallic support plate 12 and the pad 14 of friction material have holes or apertures indicated at 24 and 26 respectively, through which the friction liner is fastened, for example by means of rivets, to the face plate portion mentioned above of the clutch friction plate. The head of each rivet extends into the circular hole 24 formed in the pad 14, while its shank passes through the semicircular hole 26, which has a diameter smaller than that of the hole 24. The head of the rivet is nested into the hole 24.

In the modified embodiment shown in FIG. 5, the friction liner 10 has an overall thickness E which is constant. This thickness E is also the thickness of the pad 14 of friction material in the thickest part of the latter, corresponding to its upper portion as shown in FIG. 5. For this purpose, the pad 14 of friction material is formed with a rebate 28, the depth "h" of which is substantially equal to the thickness of the metallic support plate 12. The inner edge 30 of the rebate 28 has a profile complementary to that of the corresponding portion 32 of the perimeter of the support plate 12.

Still with reference to FIG. 5, in this modified embodiment the friction liner 10 is in contact with the corresponding surface of the face plate portion of the clutch friction plate through a composite surface which is substantially equal in area to the working surface of the pad 14 of friction material. The lower part of the support 12 is omitted.

Reference is now made to FIGS. 6 to 9 showing the second embodiment of the invention. The same reference numerals are used in FIGS. 6 to 9 to indicate those elements that are identical or equivalent to those shown in FIGS. 1 to 5. In this second embodiment, the friction liner 10 is relieved in both its upper and its lower portions.

Here the pad 14 of friction material has a shape and thickness that are identical to those in the embodiment shown in FIGS. 1 to 4. The metallic support plate 12 again lies facing the outer portion of the friction pad 14. However, the support plate 12 is here formed with a recess 34 in its outer peripheral edge, this recess 34 being in the form of an arc of a circle 36. In addition, the edge 32 of the inner portion of the profile of the support plate 12 is situated radially inwardly of the position it occupied in the first embodiment described above. The pad 14 extends beyond the edge 32. In FIGS. 6 to 9, the hole 26 is circular so that a larger seating area is offered to the head of the rivet. The support 12 thus extends radially over an increased height which is greater than half that of the friction pad 14. In FIGS. 6 to 9, the thickness "e" of the friction pad is constant, whereas in the modified version shown in FIG. 10, as also in the case of the modified embodiment described above with reference to FIG. 5, it is the overall thickness E of the friction liner 10 that is constant.

Referring now to FIG. 11, this shows in full lines a portion 40 of a prior art pressure plate and a friction liner 10, with these two elements being shown with the profile which they have when subjected to deformation due to being heated. As previously stated, heating caused during clutch engagement results in uneven thermal expansion. This causes the pressure plate to gradually adopt a conical shape and the friction liners to deform into the curved shape shown in FIG. 11. Their profile when cold is indicated in broken lines. As will easily be seen from FIG. 11, the mean contact radius R1 of the friction liner 10 on the corresponding surface 42 of the pressure plate 40 is reduced to its minimum.

By contrast, and as shown in FIG. 12, the mean contact radius R2 when using a friction liner 10 in accordance with the present invention is substantially increased. This mean contact radius is substantially equal to the mean radius of the friction liner 10, due to the fact that its support plate 12 does not completely overlie the whole of the pad 14 of friction material, the lower or radially inner portion of the support plate being cut away or omitted in all cases. Thus, the structural arrangement of the instant invention is such that the friction pad 14 is supported by the support plate 12 primarily in the upper region whereby the friction pad 14 extends radially inside the radially innermost region 32 of the support plate 12. This arrangement provides an increase in the mean contact radius R2, which leads to an increase in the overall efficiency of the clutch, and therefore an increase in the torque transmission.

The friction liners made in accordance with the invention may be used in numerous designs of clutch friction plates, and in particular in connection with those disclosed in the specification of French published patent application No. FR 2 666 859A, reference to which is invited for more details.

The friction liners may, in particular, have a rolling surface on the side of the contact or face plate portion of the clutch friction plate carrying the liners, with each friction liner being able to be engaged in a window of the clutch friction plate in which they are mounted in a floating manner.

What is claimed is:

1. A friction liner for a clutch friction plate, comprising a metallic support plate and a pad of friction material overlaid on the support plate, the pad defining a working surface for contact with a pressure plate of a clutch and the support plate having a facing surface in contact with the pad, wherein said facing surface is smaller than said working surface and said working surface extends radially inside a radially innermost portion of said facing surface, and wherein the pad has a fixing surface in contact with said facing surface of the support plate, said fixing surface defining at least one rebate the depth of which is substantially equal to the thickness of the support plate, with the profile of the rebate corresponding substantially to a corresponding portion of the perimeter of the support plate enclosed therein, whereby the thickness of the friction liner is substantially constant.

2. A friction liner according to claim 1, substantially in the shape of an annular sector, with the support plate lying in register with a portion of the pad defining the largest radius of the latter.

3. A friction liner according to claim 2, wherein the support plate is formed with a recess in its outer peripheral edge.

* * * * *